(12) United States Patent
Liu et al.

(10) Patent No.: US 11,605,085 B2
(45) Date of Patent: Mar. 14, 2023

(54) METHODS AND APPARATUS FOR FRAUD DETECTION

(71) Applicant: Walmart Apollo, LLC, Bentonville, AR (US)

(72) Inventors: Lian Liu, Santa Clara, CA (US); Vidhya Raman, San Jose, CA (US); Hui-Min Chen, Pleasanton, CA (US); Sangita Fatnani, Cupertino, CA (US)

(73) Assignee: Walmart Apollo, LLC, Bentonville, AR (US)

(*) Notice: Subject to any disclaimer, the term of this patent is extended or adjusted under 35 U.S.C. 154(b) by 184 days.

(21) Appl. No.: 16/256,903

(22) Filed: Jan. 24, 2019

(65) Prior Publication Data
US 2020/0242610 A1   Jul. 30, 2020

(51) Int. Cl.
*G06Q 20/40* (2012.01)
*G06F 17/11* (2006.01)

(52) U.S. Cl.
CPC ......... *G06Q 20/4016* (2013.01); *G06F 17/11* (2013.01); *G06Q 20/407* (2013.01)

(58) Field of Classification Search
CPC .. G06Q 20/4016; G06Q 20/407; G06F 17/11; G06K 9/6269; G06K 9/6284; G06K 9/6262
USPC ........................................................ 705/304
See application file for complete search history.

(56) References Cited

U.S. PATENT DOCUMENTS

| 4,754,410 A | * | 6/1988 | Leech | D01H 9/00 |
| | | | | 706/45 |
| 5,819,226 A | * | 10/1998 | Gopinathan | G06Q 20/00 |
| | | | | 705/44 |
| 5,884,289 A | * | 3/1999 | Anderson | G06Q 20/105 |
| | | | | 705/41 |

(Continued)

FOREIGN PATENT DOCUMENTS

WO   WO-2017003666 A1 * 1/2017 ........... G06N 3/0454

OTHER PUBLICATIONS

Shapiro, A., Wardi, Y. Convergence analysis of gradient descent stochastic algorithms. J Optim Theory Appl 91, 439-454 (1996). https://doi.org/10.1007/BF02190104 (Year: 1996).*

(Continued)

*Primary Examiner* — Sarah M Monfeldt
*Assistant Examiner* — John S. Wasaff
(74) *Attorney, Agent, or Firm* — Morgan, Lewis & Bockius LLP; Manita Rawat (57) ABSTRACT

This application relates to apparatus and methods for identifying fraudulent transactions. A computing device receives return data identifying the return of at least one item. The computing device obtains modified strategy data identifying at least one rule of a modified strategy. The rule may be based on the application of at least one discrete stochastic gradient descent algorithm to an initial strategy. The computing device applies the modified strategy to the received return data identifying the return of the at least one item, and determines whether the return of the at least one item is fraudulent based on the application of the modified strategy. The computing device generates fraud data identifying whether the return of the at least one item is fraudulent based on the determination, and may transmit the fraud data to (Continued)

another computing device to indicate whether the return is fraudulent.

17 Claims, 7 Drawing Sheets

(56) References Cited

U.S. PATENT DOCUMENTS

| | | | | |
|---|---|---|---|---|
| 7,455,226 | B1* | 11/2008 | Hammond | G06Q 20/202 705/28 |
| 8,073,785 | B1* | 12/2011 | Candella | G06Q 40/08 705/76 |
| 10,783,520 | B2* | 9/2020 | Moss | G06Q 20/4016 |
| 10,832,248 | B1* | 11/2020 | Kramme | G06N 5/046 |
| 2002/0099649 | A1* | 7/2002 | Lee | G06Q 20/4016 705/38 |
| 2003/0069820 | A1* | 4/2003 | Hillmer | G06Q 20/4016 705/35 |
| 2004/0083096 | A1* | 4/2004 | Chu | G10L 19/022 704/219 |
| 2008/0319932 | A1* | 12/2008 | Yih | G06Q 10/10 706/20 |
| 2009/0048934 | A1* | 2/2009 | Haddad | G06Q 40/12 705/17 |
| 2009/0076870 | A1* | 3/2009 | Hammond | G06Q 20/202 235/385 |
| 2009/0327132 | A1* | 12/2009 | Diev | G06Q 40/02 705/44 |
| 2010/0114617 | A1* | 5/2010 | Bobbitt | G06Q 20/202 705/75 |
| 2011/0087606 | A1* | 4/2011 | Hammond | G06Q 20/407 705/304 |
| 2011/0295774 | A1* | 12/2011 | Chen | G06N 20/00 706/12 |
| 2013/0054438 | A1* | 2/2013 | Boding | G06Q 20/405 705/35 |
| 2013/0346350 | A1* | 12/2013 | Subramanian | G06N 3/08 706/20 |
| 2014/0142929 | A1* | 5/2014 | Seide | G06N 3/08 704/202 |
| 2014/0172697 | A1* | 6/2014 | Ward | G06Q 20/4016 705/39 |
| 2014/0278883 | A1* | 9/2014 | Wang | G06Q 30/0225 705/14.26 |
| 2016/0148209 | A1* | 5/2016 | Hammond | G06Q 20/407 705/21 |
| 2017/0200164 | A1* | 7/2017 | Choi | G06N 20/00 |
| 2017/0270526 | A1* | 9/2017 | Fitzgerald | G06N 20/00 |
| 2018/0182029 | A1* | 6/2018 | Vinay | G06Q 40/025 |
| 2018/0300631 | A1 | 10/2018 | Roy | |
| 2018/0329798 | A1* | 11/2018 | Zhou | G06Q 10/04 |
| 2019/0026489 | A1* | 1/2019 | Nerurkar | G06N 20/00 |
| 2019/0325271 | A1 | 10/2019 | Nair | |
| 2020/0118036 | A1 | 4/2020 | Karnagel | |
| 2020/0175421 | A1* | 6/2020 | Zhou | G06N 20/10 |
| 2020/0242611 | A1 | 7/2020 | Raman et al. | |
| 2021/0374764 | A1* | 12/2021 | Kramme | G06Q 20/102 |

OTHER PUBLICATIONS

Léon Bottou: Stochastic Gradient Learning in Neural Networks, Proceedings of Neuro-Nîmes 91, EC2, Nimes, France, 1991. (Year: 1991).*

Richter, Matthias. "Guided Linear Dimensionality Reduction by Stochastic Gradient Descent." of Fraunhofer IOSB and Institute for Anthropomatics, Vision and Fusion Laboratory (2016): 61. (Year: 2016).*

Fotakis et al., "Efficient Online Learning of Optimal Rankings: Dimensionality Reduction via Gradient Descent," Nov. 5, 2020, 23 pages.

* cited by examiner

Algorithm: DSGD $(S, C, c)$
1. Initialize the learning rates $\alpha_1, \ldots, \alpha_k$ and $\delta_1, \ldots, \delta_k$;
2. Randomly partition $D$ into mini-batches $D_0, \ldots, D_{m-1}$;
3. Let $R = \{\theta_1, \ldots, \theta_k\}$ and $b = 0$;
4. while $R \neq \emptyset$:
5.    Compute the average bad probability $p = \frac{1}{|A_{D_b}(S_\theta)|} \sum_{x \in A_{D_b}(S_\theta)} C(x)$;
6.    for each $i = 1, \ldots, k$:
7.       Compute $\partial_i$ using $D_b$;
8.    while $p + \partial_i < c$:
9.       if $\alpha_i \geq e\delta_i$:
10.          Let $\alpha_i = \alpha_i/e$ and recalculate $\partial_i$;
11.       else:
12.          Remove $\theta_i$ from $R$;
13.    Let $j = \underset{i}{\mathrm{argmax}}\, \partial_i$;
14.    Let $\theta_j = \theta_j - \alpha_j$;
15.    $b = (b + 1) \bmod m$;

FIG. 7

METHODS AND APPARATUS FOR FRAUD DETECTION

TECHNICAL FIELD

The disclosure relates generally to fraud detection and, more specifically, to identifying fraudulent retail activities.

BACKGROUND

Some transactions, such as some in-store or online retail transactions, are fraudulent. For example, a customer may attempt to return an item to a store from which it was not purchased. For example, the item may have been stolen from a different store. As another example, a customer may attempt to return an item with another's receipt that includes the same or a similar item. In some cases, a customer may present another's identification (ID) card (e.g., driver's license) when attempting to return an item. In some cases, a customer may buy and use an item, and may attempt to return the item when the person no longer has a need for the item.

In each of these examples, the customer is involved in a fraudulent activity. Fraudulent activities may cause financial harm to a company, such as a retailer. For example, the company may incur expense in accepting the item and returning payment for the item. The company may also incur expenses related to inventorying and stocking the item, attempting to resell the item, returning the item to a manufacturer, or disposing the item. In addition, workers, such as retail workers, must spend time in processing the return, for example. As such, a retailer may benefit from identifying fraudulent transactions before the transaction is complete.

SUMMARY

The embodiments described herein are directed to automatically identifying fraudulent transactions. The embodiments may identify a fraudulent activity as it is taking place, for example, allowing a retailer to stop or not allow the transaction. For example, the embodiments may allow a retailer to identify a suspected fraudulent activity. The retailer may then more closely scrutinize the transaction to determine if fraud is indeed involved. As a result, the embodiments may allow a retailer to decrease expenses related to fraudulent transactions.

In accordance with various embodiments, exemplary systems may be implemented in any suitable hardware or hardware and software, such as in any suitable computing device. For example, in some embodiments, a computing device is configured to receive return data identifying the return of at least one item. For example, the return data may be received from a computing device located at a store as a customer is attempting to return an item. The computing device may also be configured to obtain modified strategy data identifying at least one rule of a modified strategy. The rule may be based on the application of at least one discrete stochastic gradient descent (DSGD) algorithm to an initial strategy. The computing device may be configured to apply the modified strategy to the received return data identifying the return of the at least one item, and determine whether the return of the at least one item is fraudulent based on the application of the modified strategy. The computing device may be further configured to generate fraud data identifying whether the return of the at least one item is fraudulent based on the determination. The computing device may also be configured to transmit, in response to the received return data, the fraud data identifying whether the return of the at least one item is fraudulent. For example, the computing device may transmit the fraud data to the computing device located at the store.

In some embodiments, a method is provided that includes receiving return data identifying the return of at least one item. The method may also include obtaining modified strategy data identifying at least one rule of a modified strategy that is based on the application of at least one discrete stochastic gradient descent (DSGD) algorithm to an initial strategy. The method may also include applying the modified strategy to the received return data identifying the return of the at least one item, and determining whether the return of the at least one item is fraudulent based on the application of the modified strategy. The method may further include generating fraud data identifying whether the return of the at least one item is fraudulent based on the determination. The method may also include transmitting, in response to the received return data, the fraud data identifying whether the return of the at least one item is fraudulent.

In yet other embodiments, a non-transitory computer readable medium has instructions stored thereon, where the instructions, when executed by at least one processor, cause a computing device to perform operations that include receiving return data identifying the return of at least one item. The operations may also include obtaining modified strategy data identifying at least one rule of a modified strategy that is based on the application of at least one discrete stochastic gradient descent (DSGD) algorithm to an initial strategy. The operations may also include applying the modified strategy to the received return data identifying the return of the at least one item, and determining whether the return of the at least one item is fraudulent based on the application of the modified strategy. The operations may further include generating fraud data identifying whether the return of the at least one item is fraudulent based on the determination. The operations may also include transmitting, in response to the received return data, the fraud data identifying whether the return of the at least one item is fraudulent.

BRIEF DESCRIPTION OF THE DRAWINGS

The features and advantages of the present disclosures will be more fully disclosed in, or rendered obvious by the following detailed descriptions of example embodiments. The detailed descriptions of the example embodiments are to be considered together with the accompanying drawings wherein like numbers refer to like parts and further wherein.

DETAILED DESCRIPTION

The description of the preferred embodiments is intended to be read in connection with the accompanying drawings, which are to be considered part of the entire written description of these disclosures. While the present disclosure is susceptible to various modifications and alternative forms, specific embodiments are shown by way of example in the drawings and will be described in detail herein. The objectives and advantages of the claimed subject matter will become more apparent from the following detailed description of these exemplary embodiments in connection with the accompanying drawings.

It should be understood, however, that the present disclosure is not intended to be limited to the particular forms disclosed. Rather, the present disclosure covers all modifications, equivalents, and alternatives that fall within the spirit and scope of these exemplary embodiments. The terms "couple," "coupled," "operatively coupled," "operatively connected," and the like should be broadly understood to refer to connecting devices or components together either mechanically, electrically, wired, wirelessly, or otherwise, such that the connection allows the pertinent devices or components to operate (e.g., communicate) with each other as intended by virtue of that relationship.

Figure 1:
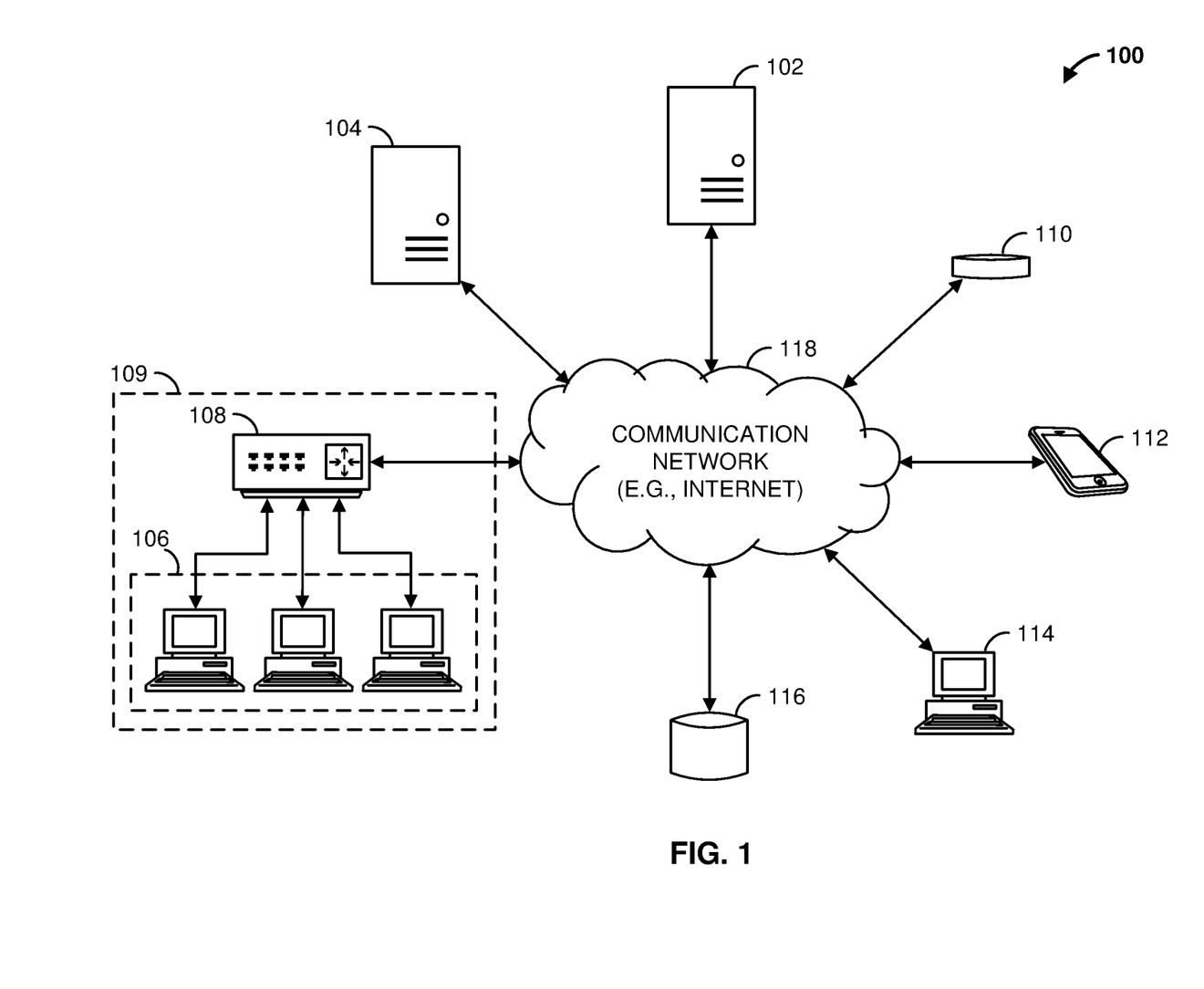
FIG. 1 is a block diagram of a fraud detection system in accordance with some embodiments.

Turning to the drawings, FIG. 1 illustrates a block diagram of a fraud detection system 100 that includes a fraud detection computing device 102 (e.g., a server, such as an application server), a server 104 (e.g., a web server), workstation(s) 106, database 116, and multiple customer computing devices 110, 112, 114 operatively coupled over network 118. Fraud detection computing device 102, workstation(s) 106, server 104, and multiple customer computing devices 110, 112, 114 can each be any suitable computing device that includes any hardware or hardware and software combination for processing and handling information. In addition, each can transmit data to, and receive data from, communication network 118.

For example, fraud detection computing device 102 can be a computer, a workstation, a laptop, a server such as a cloud-based server, or any other suitable device. Each of multiple customer computing devices 110, 112, 114 can be a mobile device such as a cellular phone, a laptop, a computer, a table, a personal assistant device, a voice assistant device, a digital assistant, or any other suitable device.

Additionally, each of fraud detection computing device 102, server 104, workstations 106, and multiple customer computing devices 110, 112, 114 can include one or more processors, one or more field-programmable gate arrays (FPGAs), one or more application-specific integrated circuits (ASICs), one or more state machines, digital circuitry, or any other suitable circuitry.

Although FIG. 1 illustrates three customer computing devices 110, 112, 114, fraud detection system 100 can include any number of customer computing devices 110, 112, 114. Similarly, fraud detection system 100 can include any number of workstation(s) 106, fraud detection computing devices 102, servers 104, and databases 116.

Workstation(s) 106 are operably coupled to communication network 118 via router (or switch) 108. Workstation(s) 106 and/or router 108 may be located at a store 109, for example. Workstation(s) 106 can communicate with fraud detection computing device 102 over communication network 118. The workstation(s) 106 may send data to, and receive data from, fraud detection computing device 102. For example, the workstation(s) 106 may transmit data related to a return, such as the return of an item, to fraud detection computing device 102. In response, fraud detection computing device 102 may transmit an indication of whether the return of the item is suspected of being fraudulent. Workstation(s) 106 may also communicate with server 104. For example, server 104 may be a web server and host one or more web pages, such as a retailer's website. Workstation(s) 106 may be operable to access and program (e.g., configure) the webpages hosted by server 104.

Fraud detection computing device 102 is operable to communicate with database 116 over communication network 118. For example, fraud detection computing device 102 can store data to, and read data from, database 116. Database 116 can be a remote storage device, such as a cloud-based server, a memory device on another application server, a networked computer, or any other suitable remote storage. Although shown remote to fraud detection computing device 102, in some examples, database 116 can be a local storage device, such as a hard drive, a non-volatile memory, or a USB stick.

Communication network 118 can be a WiFi® network, a cellular network such as a 3GPP® network, a Bluetooth® network, a satellite network, a wireless local area network (LAN), a network utilizing radio-frequency (RF) communication protocols, a Near Field Communication (NFC) network, a wireless Metropolitan Area Network (MAN) connecting multiple wireless LANs, a wide area network (WAN), or any other suitable network. Communication network 118 can provide access to, for example, the Internet.

First customer computing device 110, second customer computing device 112, and $N^{th}$ customer computing device 114 may communicate with web server 104 over communication network 118. For example, web server 104 may host one or more webpages of a website. Each of multiple computing devices 110, 112, 114 may be operable to view, access, and interact with the webpages hosted by web server 104. In some examples, web server 104 hosts a web page for a retailer that allows for the purchase of items. For example, an operator of one of multiple computing devices 110, 112, 114 may access the web page hosted by web server 104, add one or more items to an online shopping cart of the web page, and perform an online checkout of the shopping cart to purchase the items.

In some examples, the web page may be operated by a retailer and allow for the initiation of the return of an item. For example, an operator of one of multiple computing devices 110, 112, 114 may submit information on the web page to return an item. In these examples, web server 104 may transmit data that identifies the attempted return to fraud detection computing device 102. In response, fraud detection computing device 102 may transmit an indication of whether the attempted return is suspected of being fraudulent. The customer may complete the return of the item by dropping the item off at a retail location of the retailer. In some examples, the customer may complete the return of the item by mailing the item to the retailer. In some examples, the customer may return the item at a service desk at the retail location.

Fraud detection system 100 may allow for the identification of activities that may be fraudulent. For example, fraud detection system 100 may identify an attempted in-store return of an item as fraudulent. Fraud detection system 100 may also identify online initiated returns as fraudulent. In some examples, fraud detection system 100 may identify completed returns as fraudulent (e.g., the item has been returned to a retailer and the customer has received payment for the returned item).

In some examples, fraud detection system 100 collects a set of training examples and builds a set of features for these examples (e.g., feature engineering). Possible features may include the total amount of a return, the number of items returned, whether or not a receipt is presented, how many returns a particular customer has made over a previous period of time (e.g., in the past few days, etc.). The set of training examples may be based on previous transactions, such as the return of previous items either in-store or online, and are identified (e.g., by a reviewer) as either fraudulent or not fraudulent. For example, fraud instances may be identified as positive (e.g., 1), and non-fraud instances may be identified as negative (e.g., 0). The training examples may be stored in database 116, for example.

Fraud detection computing device 102 may employ a classifier, such as one based on Logistic Regression, Support Vector Machines, Random Forest, or Gradient Boosting Machines. The classifier may be trained with the set of training examples. Based on being trained with the training examples, the classifier may be configured to identify a probability that a provided data set identifying a transaction, such as the return of an item, is fraudulent.

Fraud detection computing device 102 may generate a strategy (e.g., one or more rules) that captures the fraud instances of the training examples. The strategy may be a logical expression of the feature space, such as the feature space used to train the classifier. For example, the strategy may include the output of the classifier (e.g., the probability that a particular data set identifying a fraudulent transaction), and/or other conditions, such as conditions identified by human reviewers. For example, the strategy may include a requirement that the output of the classifier be greater than or equal to a threshold amount. In other words, given a feature set "x" provided to the classifier, a strategy (e.g., strategy S) could be as simple as $C(x)>0.75$, where C is the trained classifier. In this example, to be identified as fraudulent, the output of the classifier must be greater than 0.75. In other words, the classifier, for a particular feature set, determines that the probability that the feature set is associated with fraudulent activity is greater than 75%.

The strategy generated by fraud detection computing device 102 may also include required or alternate conditions of the feature set for a particular transaction, such as the requirement that the amount of a return be beyond (e.g., greater than) a threshold amount. For example, a more sophisticated strategy (e.g., strategy S) may be:

$$C(x)>0.75 \text{ OR } (x_1>30 \text{ AND } (x_5<0.27 \text{ OR } x_9=0)) \text{ OR } x_4>13 \qquad \text{eq. (1)}$$

where each $x_i$ is the i-th feature of x.

Here, "OR" indicates an alternative condition such that at least one of two conditions must be true for the overall expression to be true, and "AND" indicates a required condition such that both conditions must be true for the overall expression to be true. In this example, a transaction may be identified as fraudulent if one of three conditions are met. Specifically, for the classifier to identify a transaction as fraudulent (e.g., S(x)=true), the output of the classifier must be at least 0.75, the first feature must be greater than 30 and either the fifth feature must be less than 0.27 or the ninth feature must be 0, or the fourth feature must be greater than 13. Each of the conditions may be referred to as the rules of the strategy, were the action space of the strategy may be defined as:

$$A=\{x \in X | S(x)=\text{true}\} \qquad \text{eq. (2)}$$

Based on the initial strategy (e.g., strategy S) and the output of the classifier (e.g., C(x)), fraud detection computing device 102 may generate a modified strategy (e.g., strategy S'). Modified strategy S' may include a larger "action space" than the initial strategy S. In other words, modified strategy S' may identify more examples in the training set as fraudulent than the initial strategy S identifies. Modified strategy S' may be based on the same set of features as in the initial strategy, or a different, yet reduced, set of features. In some examples, the modified strategy is based on applying one or more discrete stochastic gradient descent (DSGD) algorithms to the initial strategy. In some examples, the modified strategy is based on applying one or more dimensionality reduction (DR) algorithms to the initial strategy. In some examples, at least one of each of a DSGD algorithm and DR algorithm is applied.

Once the modified strategy is applied, in some examples, the accuracy of the modified strategy is determined. For example, fraud detection computing device 102 may compare the output of the modified strategy (e.g., indicating whether a transaction is fraudulent) to a predetermine determination for the same feature set. In some examples, the classifier may be retrained, and the initial strategy S and modified strategy S' may be updated based on the retrained classifier. In some examples, the classifier is retrained with training sets, such as refreshed training sets (e.g., by incorporating the output of the modified strategy), and the initial strategy and modified strategy are updated until the modified strategy produces no false positives (e.g., transactions identified by the modified strategy as fraudulent that should not be identified as such). In some examples, the initial strategy and modified strategy are updated until a certain stopping criteria is met (e.g., false positive rate or percentage of transactions that are misclassified are below some threshold value).

Once finalized, fraud detection computing device 102 may employ the modified classifier to determine whether in-store or online transactions are fraudulent. For example, upon the attempted return of an item to a store 109, workstation 106 may transmit data related to the attempted return to fraud detection computing device 102. Fraud detection computing device 102 may apply the modified strategy to the received data, and determine whether the transaction is should be suspected of being fraudulent (e.g., associated with fraudulent activities). Fraud detection computing device 102 may transmit data indicating whether the attempted return is fraudulent to workstation 106. If the data indicates that the transaction may be fraudulent, an operator of workstation 106, such as a retailer's associate, may undergo precautionary measures to either verify that the transaction is fraudulent, which the associated may then stop, or not fraudulent, which the associate may then allow. On the other hand, if both the initial strategy S and the modified strategy S' have little or no false positive transactions, fraud detection computing device 102 may deny the attempted return directly, such as be denying a credit card transaction, for example.

Figure 2:
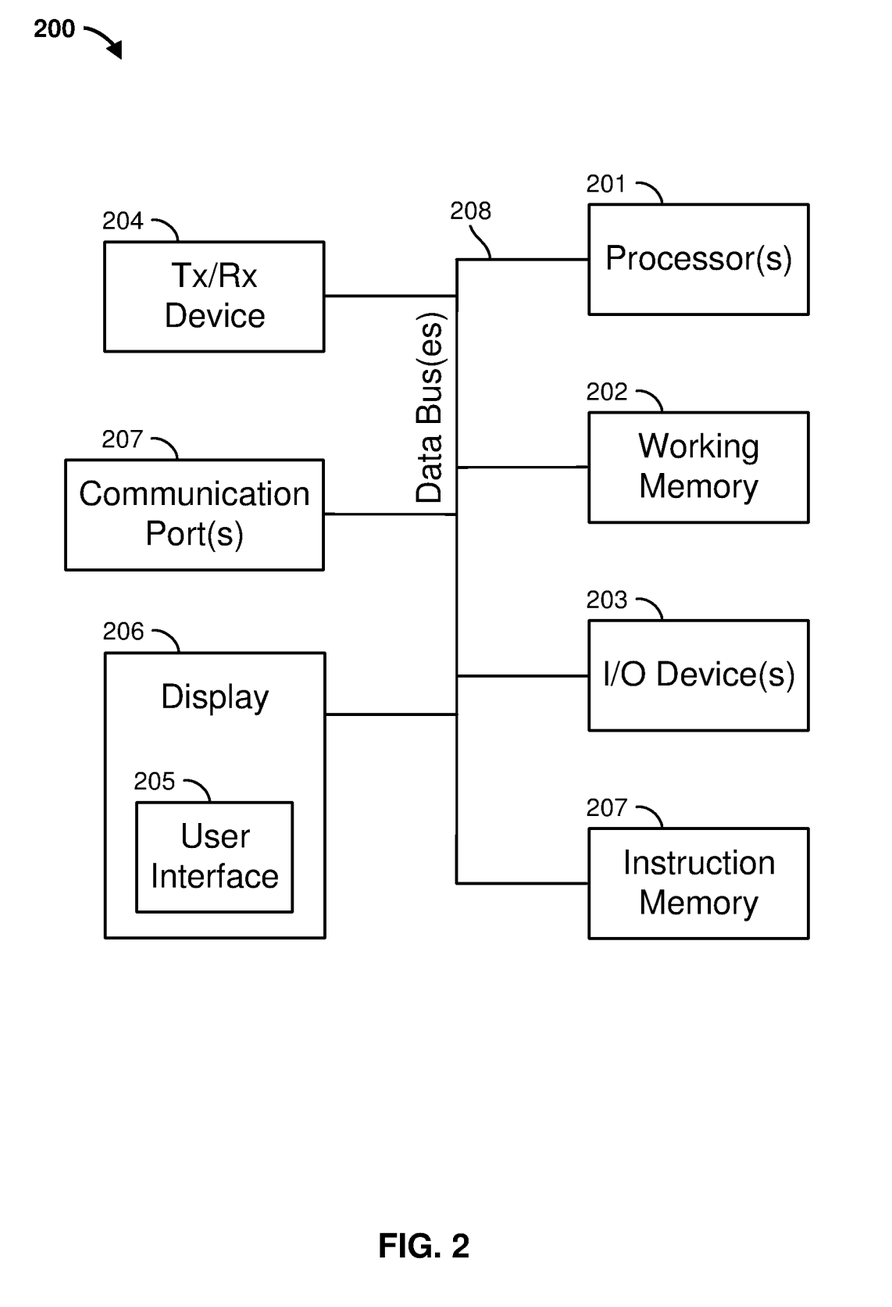
FIG. 2 is a block diagram of the fraud detection computing device of the fraud detection system of FIG. 1 in accordance with some embodiments.

FIG. 2 illustrates the fraud detection computing device 102 of FIG. 1. Fraud detection computing device 102 can include one or more processors 201, working memory 202, one or more input/output devices 203, instruction memory 207, a transceiver 204, one or more communication ports 207, and a display 206, all operatively coupled to one or more data buses 208. Data buses 208 allow for communication among the various devices. Data buses 208 can include wired, or wireless, communication channels.

Processors 201 can include one or more distinct processors, each having one or more cores. Each of the distinct processors can have the same or different structure. Processors 201 can include one or more central processing units (CPUs), one or more graphics processing units (GPUs), application specific integrated circuits (ASICs), digital signal processors (DSPs), and the like.

Processors 201 can be configured to perform a certain function or operation by executing code, stored on instruction memory 207, embodying the function or operation. For example, processors 201 can be configured to perform one or more of any function, method, or operation disclosed herein.

Instruction memory 207 can store instructions that can be accessed (e.g., read) and executed by processors 201. For example, instruction memory 207 can be a non-transitory, computer-readable storage medium such as a read-only memory (ROM), an electrically erasable programmable read-only memory (EEPROM), flash memory, a removable disk, CD-ROM, any non-volatile memory, or any other suitable memory.

Processors 201 can store data to, and read data from, working memory 202. For example, processors 201 can store a working set of instructions to working memory 202, such as instructions loaded from instruction memory 207. Processors 201 can also use working memory 202 to store dynamic data created during the operation of fraud detection computing device 102. Working memory 202 can be a random access memory (RAM) such as a static random access memory (SRAM) or dynamic random access memory (DRAM), or any other suitable memory.

Input-output devices 203 can include any suitable device that allows for data input or output. For example, input-output devices 203 can include one or more of a keyboard, a touchpad, a mouse, a stylus, a touchscreen, a physical button, a speaker, a microphone, or any other suitable input or output device.

Communication port(s) 207 can include, for example, a serial port such as a universal asynchronous receiver/transmitter (UART) connection, a Universal Serial Bus (USB) connection, or any other suitable communication port or connection. In some examples, communication port(s) 207 allows for the programming of executable instructions in instruction memory 207. In some examples, communication port(s) 207 allow for the transfer (e.g., uploading or downloading) of data, such as impression data and/or engagement data.

Display 206 can display user interface 205. User interfaces 205 can enable user interaction with fraud detection computing device 102. For example, user interface 205 can be a user interface for an application of a retailer that allows a customer to initiate the return of an item to the retailer. In some examples, a user can interact with user interface 205 by engaging input-output devices 203. In some examples, display 206 can be a touchscreen, where user interface 205 is displayed on the touchscreen.

Transceiver 204 allows for communication with a network, such as the communication network 118 of FIG. 1. For example, if communication network 118 of FIG. 1 is a cellular network, transceiver 204 is configured to allow communications with the cellular network. In some examples, transceiver 204 is selected based on the type of communication network 118 fraud detection computing device 102 will be operating in. Processor(s) 201 is operable to receive data from, or send data to, a network, such as communication network 118 of FIG. 1, via transceiver 204.

Figure 3:
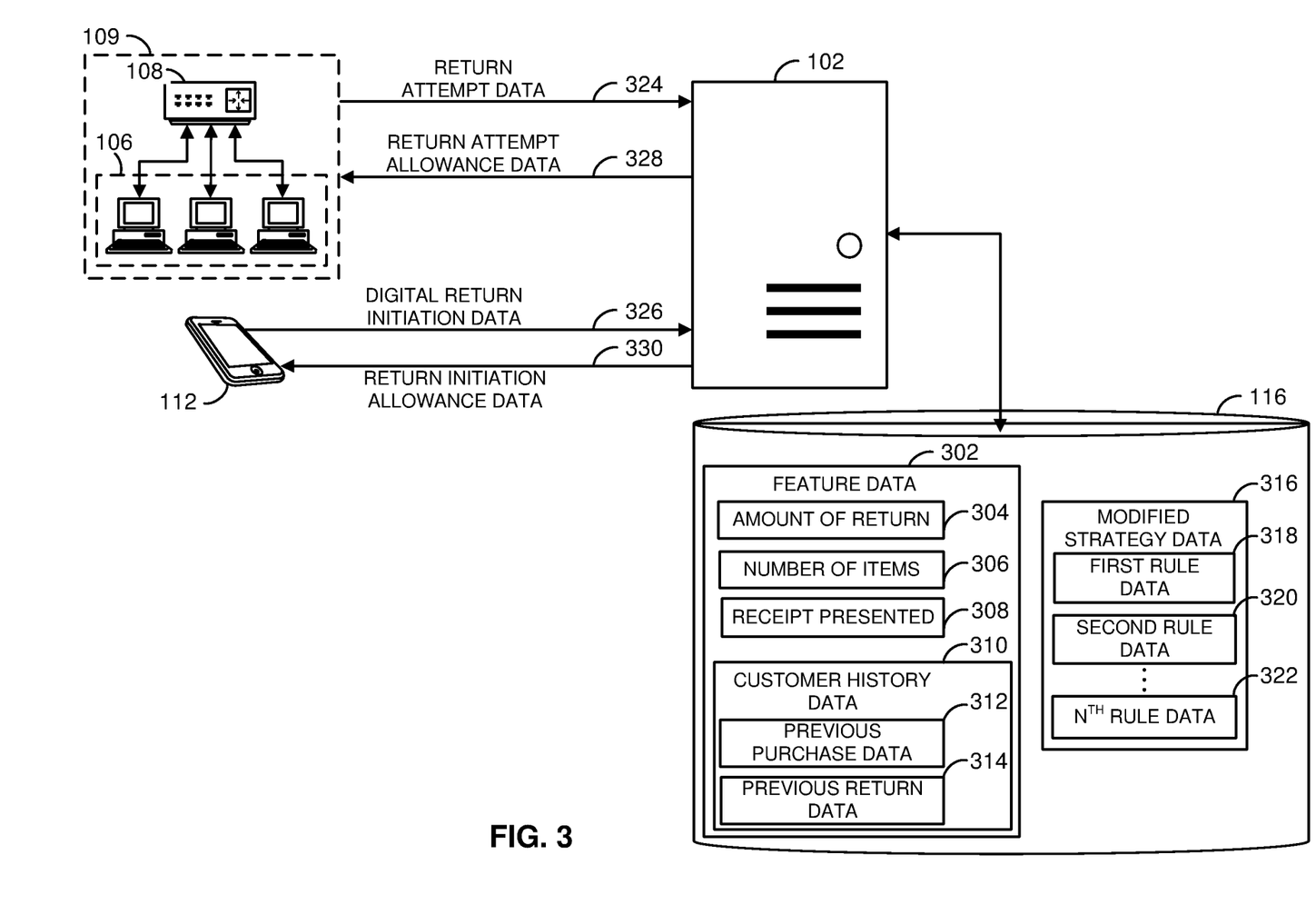
FIG. 3 is a block diagram illustrating examples of various portions of the fraud detection system of FIG. 1 in accordance with some embodiments.

FIG. 3 is a block diagram illustrating examples of various portions of the fraud detection system of FIG. 1. In this example, fraud detection computing device 102 receives from a store 109 (e.g., from a computing device, such as workstation 106, at a store location) return attempt data 324 identifying data associated with the return of an item. Return attempt data 324 may include, for example, one or more of the following: an identification of one or more items being returned; an indication of whether a receipt has been presented; an identification of the customer (e.g., customer ID, passport ID, driver's license number, etc.); a monetary amount (e.g., price) of each item being returned; the method of payment used to purchase the items (e.g., credit card, cash, check); an item Universal Product Code (UPC) number; an indication of the reason for returning the item (e.g., defect, exchange, etc.); an indication of whether the items are currently in stock; an indication of a time period of when the items where in stock; or any other data related to the return of the items.

Fraud detection computing device 102 may process return attempt data 324 to determine feature data relevant to the application of a modified strategy (e.g., strategy S'). For example, fraud detection computing device 102 may parse return attempt data 324 to store relevant feature data 302 in database 116. Feature data 302 may include any features the modified strategy may take in as an input (e.g., feature set "x"). In this example, feature data 302 includes an amount of return 304, which may identify the total price of all items being returned, a number of items 306, which may identify the total number of items being returned, receipt presented 308, which may identify whether a receipt has been presented for the return, and customer history data 310. In some examples, fraud detection computing device 102 receives customer history data 310 in return attempt data 324. Customer history data 310 may include previous purchase data 312 and previous return data 314. Previous purchase data 312 may identify previous purchase history (e.g., items purchased, date of purchase, price of each item, etc.), while previous return data 314 may identify previous return history (e.g., items returned, dates when returned, amount of each return, etc.).

In some examples, fraud detection computing device 102 determines customer history data 310 based on return attempt data 324. For example, return attempt data 324 may identify a customer ID. The customer ID may be associated with a customer account stored in database 116 (not shown) that includes the customer's previous transactions. For example, a customer's previous transactions may include previous purchase history (e.g., items purchased, date of purchase, price of each item, etc.), and previous return history (e.g., items returned, dates when returned, amount of each return, etc.). Based on the customer ID, fraud detection computing device 102 may identify the associated customer account in database 116, and may obtain data identifying the customer's previous transactions.

Once fraud detection computing device 102 has identified feature data 302, fraud detection computing device 102 may obtain modified strategy data 316 from database 116. Modified strategy data 316 may identify one or more rules for the modified strategy. For example, modified strategy data 316 may include data identifying any number of rules, such as first rule data 318, second rule data 320, up to $N^{th}$ rule data 322. Each of first rule data 318, second rule data 320, and up to $N^{th}$ rule data 322 may identify a rule for modified strategy S' based on a classifier output requirement (e.g., C(x) >minimum value, C(x)<maximum value), an initial strategy or feature requirement (e.g., $x_i$>minimum value, $x_i$<maximum value), or any combination of any of these requirements (e.g., using "OR" or "AND").

Fraud detection computing device 102 may apply a classifier to the feature set identified by feature data 302, such as a classifier based on Logistic Regression, Support Vector Machines, Random Forest, or Gradient Boosting Machines, for example. Fraud detection computing device 102 may provide the output of the classifier (which may identify a probability that return attempt data 324 is associated with a fraudulent transaction), and the feature set identified by feature data 302, to the modified strategy S' to apply the one or more rules of modified strategy data 316 to determine whether the transaction associated with return attempt data 324 is fraudulent. If, for example, the modified strategy S' identifies feature data 302 as associated with a fraudulent transaction (e.g., one or more of the rules associated with modified strategy data 316 are satisfied), fraud detection computing device 102 may respond to store 109 with return attempt allowance data 328 indicating that the transaction may be fraudulent. Otherwise, if modified strategy S' does not identify feature data 302 as being associated with a fraudulent transaction, fraud detection computing device 102 may respond to store 109 with return attempt allowance data 328 indicating that the transaction is not fraudulent.

In some examples, fraud detection computing device 102 may receive digital return initiation data 326, indicating an online initiation of a return of an item. For example, an operator of customer computing device 112 may initiate the return of an item on a website for a retailer hosted on web server 104. Digital return initiation data 326, similar to return attempt data 324, may identify data associated with the return of the item. Digital return initiation data 326 may include, for example, one or more of the following: an identification of one or more items being returned; an indication of a digital receipt for the item; an identification of the customer (e.g., online customer ID, driver's license number, etc.); a monetary amount (e.g., price) of each item being returned; the method of payment used to purchase the items (e.g., credit card); an item Universal Product Code (UPC) number; an indication of the reason for returning the item (e.g., defect, exchange, etc.); an indication of whether the items are currently in stock; an indication of a time period of when the items where in stock; or any other data related to the return of the items.

Fraud detection computing device 102 may process digital return initiation data 326 to determine feature data relevant to the application of a modified strategy (e.g., strategy S'). For example, fraud detection computing device 102 may parse digital return initiation data 326 to store relevant feature data 302 in database 116. Feature data 302 may include any features the modified strategy may take in as an input (e.g., feature set "x").

Fraud detection computing device 102 may then apply the classifier to the feature set identified by feature data 302. Fraud detection computing device 102 may provide the output of the classifier (which may identify a probability that return attempt data 324 is associated with a fraudulent transaction), and the feature set identified by feature data 302, to the modified strategy S' to apply the one or more rules of modified strategy data 316 to determine whether the transaction associated with return attempt data 324 is fraudulent. If, for example, the modified strategy S' identifies feature data 302 as associated with a fraudulent transaction (e.g., one or more of the rules associated with modified strategy data 316 are satisfied), fraud detection computing device 102 may respond to customer computing device 112 with return initiation allowance data 330 indicating that the transaction may be fraudulent. Otherwise, if modified strategy S' does not identify feature data 302 as being associated with a fraudulent transaction, fraud detection computing device 102 may respond to customer computing device 112 with return initiation allowance data 330 indicating that the transaction is not fraudulent.

As indicated in the figure, customer computing device 112 may present a website 302 on display 206. In some examples, display 206 may be a touchscreen display. Website 302 may be a retailer's website, such as one hosted by server 104. Website 302 includes a search bar 304, which allows a user to search the retailer's website based on input provided to the search bar 304. The input may include, for example, one or more search terms. A user may provide the input with the use of, for example, I/O device 203. The user may initiate a search request 306 by providing the input to the search bar 304 and selecting the "Submit" icon 308. The search request 306 may include the one or more search terms provided by the user.

Figure 4:
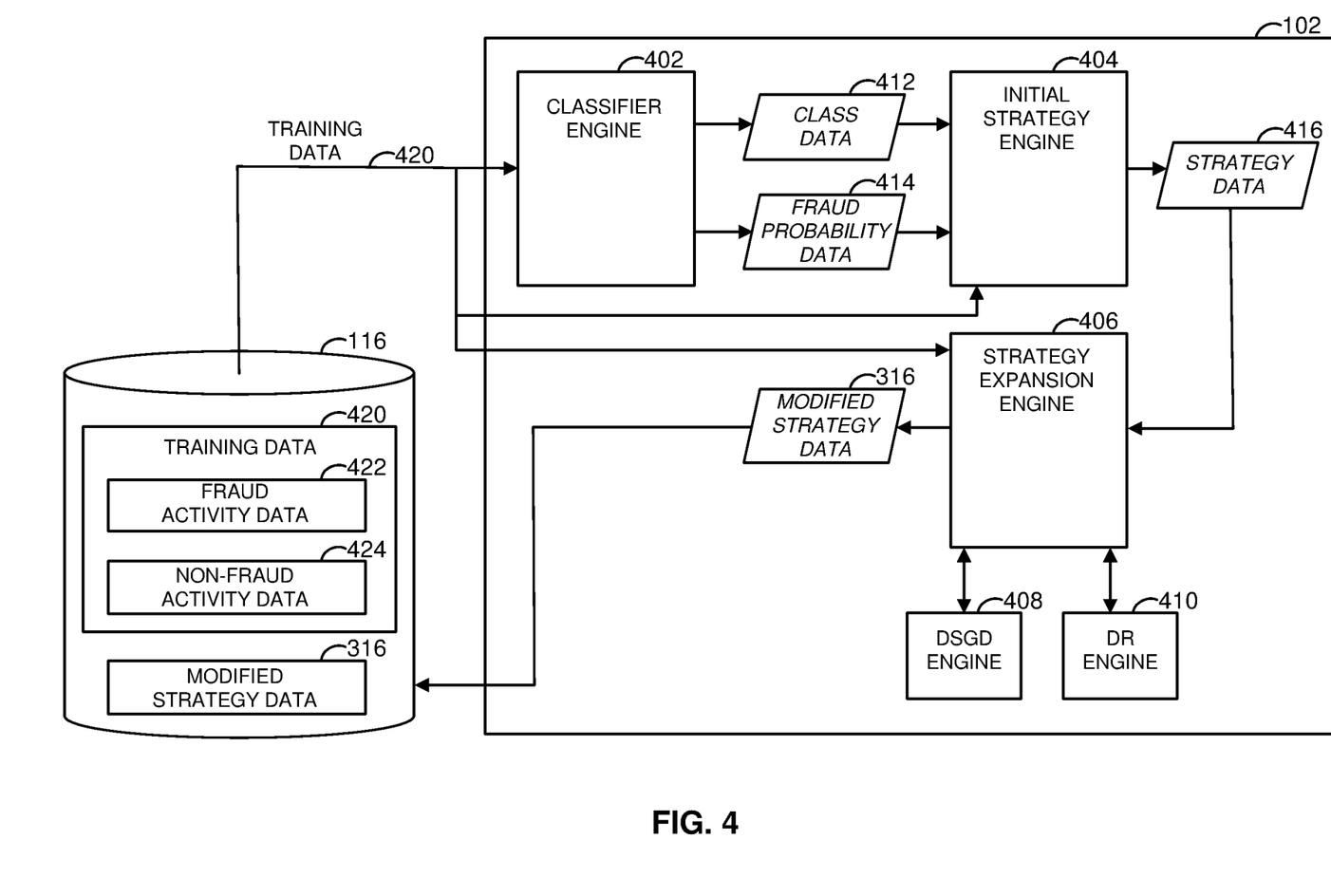
FIG. 4 is a block diagram illustrating examples of various portions of the fraud detection computing device of FIG. 1 in accordance with some embodiments.

FIG. 4 is a block diagram illustrating examples of various portions of the fraud detection computing device 102 of FIG. 1. As indicated in the figure, fraud detection computing device 102 includes classifier engine 402, initial strategy engine 404, strategy expansion engine 406, discrete stochastic gradient descent (DSGD) engine 408, and dimensionality reduction (DR) engine 410. In some examples, one or more of classifier engine 402, initial strategy engine 404, strategy expansion engine 406, discrete stochastic gradient descent (DSGD) engine 408, and dimensionality reduction (DR) engine 410 may be implemented in hardware. In some examples, one or more of classifier engine 402, initial strategy engine 404, strategy expansion engine 406, discrete stochastic gradient descent (DSGD) engine 408, and dimensionality reduction (DR) engine 410 may be implemented as an executable program maintained in a tangible, non-transitory memory, such as instruction memory 207 of FIG. 2, that may be executed by one or processors, such as processor 201 of FIG. 2.

Classifier engine 402 may be operable to obtain training data 420 from database 116 so that the employed classifier may be trained. Training data 420 may include, for example, fraud activity data 422 that identifies data associated with fraudulent transactions (as determined, for example, by a human reviewer), and non-fraud activity data 424 that identifies data associated with non-fraudulent transactions. Classifier engine 402 may be based on a supervised learning algorithm such as Logic Regression, Support Vector Machines, Random Forest, Gradient Boosting Machines, or any other suitable learning algorithm (e.g., machine learning algorithm).

Once classifier engine 402 is trained, classifier engine 402 may determine class data 412 for a particular transaction example of training data 420. Class data 412 identifies the class of a transaction example of training data 420. For example, class data 412 may identify each transaction as fraudulent, or not fraudulent. Classifier engine 402 may also determine fraud probability data 414, which identifies a probability that a transaction is fraudulent. For example, classifier engine 402 may determine a probability that a particular transaction example of training data 420 is fraudulent.

Initial strategy engine 404 may obtain class data 412 and fraud probability data 414 from classifier engine 402, and transaction data 420 from database 116, for one or more transactions to generate an initial strategy (e.g., initial strategy S). For example, initial strategy engine 404 may parse feature data from fraud activity data 422 and non-fraud activity data 424. Based on the parsed feature data and fraud probability data 414 (e.g., C(x)), initial strategy engine 404 may generate an initial strategy. The generated initial strategy may be, for example, the strategy defined in equation 1 described above. In some examples, a user adjusts a rule of the initial strategy, such as editing a rule, providing a new rule, or deleting a rule, by providing input. For example, the user may provide input via I/O device 203 to fraud detection computing device 102 to adjust the initial strategy. Initial strategy engine 404 generates strategy data 416 which identifies and characterizes the rules for the initial strategy. Strategy data 416 may identify and characterize, for example, a classifier requirement (e.g., C(x)<maximum value, C(x)>minimum value), a feature requirement (e.g., $x_i$<maximum value, $x_i$>minimum value), or any other suitable strategy rule.

Strategy expansion engine 406 obtains strategy data 416 from initial strategy engine 404, and generates a modified strategy, which is identified and characterized by modified strategy data 316. The modified strategy may be generated based on the same set of features used to generate the initial strategy as identified by strategy data 416, or may be based on a different set of features, as identified by training data 420. In some examples, the modified strategy is based on the application of one or more discrete stochastic gradient descent (DSGD) algorithms by DSGD engine 408. In some examples, the modified strategy is based on the application of one or more dimensionality reduction (DR) algorithms by DR engine 410. In some examples, the modified strategy is based on one or more DR algorithms by DSGD engine 408, and one or more DR algorithms by DR engine 410. For example, the one or more DR algorithms by DSGD engine 408, and the one or more DR algorithms by DR engine 410, may be complementary to each other. In some examples, strategy expansion engine 406 determines whether to employ a DSGD algorithm, a DR algorithm, or both based on user input. For example, user interface 205 may provide a selection (e.g., enable/disable buttons) of any number of algorithms.

DSGD engine 408 may obtain strategy data 416 and execute a discrete stochastic gradient descent (SGD) algorithm to generate a new strategy, which may be an optimized version of the initial strategy generated by initial strategy engine 404. For example, the new strategy may include more rules that are more relaxed than the rules for the initial strategy. For example, suppose initial strategy engine 404 generates an initial strategy S as:

$$C(x)>0.75 \text{ OR } (x_1>30 \text{ AND } (x_5<0.27 \text{ OR } x_9=0)) \text{ OR } x_4>13 \quad \text{eq. (3)}$$

After running an SGD algorithm, a new strategy S' may be:

$$C(x)>0.685 \text{ OR } (x_1>27 \text{ AND } (x_5<0.27 \text{ OR } x_9=0)) \text{ OR } x_4>12 \quad \text{eq. (4)}$$

While in this example the structure of the strategy remains the same, the decision boundaries (i.e., threshold values such as 0.75 in (3) and 0.685 in (4)) are modified or relaxed. In other words the rules (e.g., conditions) in strategy S' are less restrictive than in the initial strategy S, thereby providing a larger action space in new strategy S' than in initial strategy S. DSGD engine 408 may generate optimal threshold values for the action space expansion in new strategy S' as follows.

DSGD engine 408 may assign $\theta_1, \theta_2, \ldots, \theta_k$ to be the set of all numerical thresholds for inequalities in the initial strategy S. For example, in the above initial strategy (3), $\theta_1=0.75$, $\theta_2=30$, $\theta_3=0.27$, and $\theta_4=13$. In this example, there is no threshold assigned for the $x_9$ term because there is not an inequality (rather, $x_9=0$). DSGD engine 408 assigns $\theta=(\theta_1, \theta_2, \ldots, \theta_k)$ to be the vector of all thresholds in the strategy, and assigns $S_\theta$ to be the strategy whose thresholds are set to $\theta$. DSGD engine 408 may assign D to denote the training set, such as training data 420, and DSGD engine 408 assigns $A_D(S_\theta)$ to denote the subset of the training set D that are rejected (e.g., associated with a fraudulent transaction) by strategy $S_\theta$, i.e.:

$$A_D(S_\theta)=\{x \in D | S_\theta(x)=\text{true}\} \quad \text{eq. (5)}$$

Given initial strategy S and classifier output C, DSGD engine 408 may optimize the initial strategy S according to the object function below:

$$\underset{\theta}{\text{maximize}} |A_D(S_\theta)| \quad \text{eq. (6)}$$

subject to:

$$\frac{1}{|A_D(S_\theta)|} \sum_{x \in A_D(S_\theta)} C(x) > c \quad \text{eq. (7)}$$

where "c" is a parameter representing a threshold probability of a fraudulent transaction.

The parameter "c" may be specified by a user, for example, via user interface 205 using I/O device 203. The optimization equations in (6) and (7) attempt to maximize the action space of the initial strategy while maintain a sufficiently high average fraud probability, as identified by parameter "c."

During training, in lieu of updating all thresholds simultaneously, DSGD engine 408 modifies one threshold at a time while holding all others constant. In addition, DSGD engine 408 assigns each threshold an individual learning rate. At each iteration, DSGD engine 408 updates the threshold that renders the highest average bad probability (e.g., fraudulent probability). Depending on the complexity of the strategy and learning rate design, the learning duration varies. Eventually, the learning process either converges to an optimal threshold subject to the constraints in equation (6) or terminates when a stopping criteria is met. The stopping criteria may be, for example, when an individual learning rate is less than a threshold value, or when a maximum number of learning iterations (e.g., epochs) have been executed.

Specifically, DSGD engine 408 generates a learning rate $\alpha_i$ for each threshold $\theta_i$ where the absolute value for each $\alpha_i$ is given as a function a of the strategy variable (e.g., feature) on which $\theta_i$ acts on. The sign of $\alpha_i$ depends on the direction of the inequality that immediately precedes (acts on) $\theta_i$ in the strategy. For example, if an inequality is "greater than" or "greater than or equal to" (e.g., > or ≥)," then $\alpha_i$ is positive. Otherwise, if an inequality is "less than" or "less than or equal to" (e.g., < or ≤)," then $\alpha_i$ is negative.

For example, taking the initial strategy defined in equation (3) above, DSGD engine 408 may generate learning rates $\alpha_1=\sigma(C(x))$, $\alpha_2=\sigma(x_1)$, $\alpha_3=-\sigma(x_5)$, $\alpha_4=\sigma(x_4)$, where $\sigma$ stands for the standard deviation of the acting variable (e.g., feature) calculated based on the training set (e.g., training data 420). DSGD engine 408 may also generate a minimum value $\delta_i$ for each learning rate $\alpha_i$. In some examples, if $\theta_i$ is an integer, DSGD engine 408 assigns $\delta_i=1$. Otherwise, DSGD engine 408 may assign $\delta_i$ to a small positive real number, such as $10^{-5}$.

Given a vector of thresholds $\theta=(\theta_1, \ldots, \theta_k)$ and the corresponding vector of learning rates $\alpha=(\alpha_1, \ldots, \alpha_k)$. For each $i=1, \ldots k$, DSGD engine 408 assigns $\theta'_i=(\theta_1, \ldots, \theta_i-\alpha_i, \ldots, \theta_k)$. That is, $\theta'_i$ is a copy of $\theta$ except that the $i^{th}$ entry, $\theta_i$, is changed to $\theta_i-\alpha_i$. Given a training data set D, DSGD engine 408 calculates a gain for the $i^{th}$ dimension (with respect to training set D) as:

$$\partial_i = \frac{1}{|A_D(S_{\theta'_i})|}\sum_{x \in A_D(S_{\theta'_i})} C(x) - \frac{1}{|A_D(S_\theta)|}\sum_{x \in A_D(S_\theta)} C(x) \quad \text{eq. (8)}$$

The gain for each $i^{th}$ dimension indicates a change in average bad probability of the action space after the $i^{th}$ dimension value is changed from $\theta_i$ to $\theta_i-\alpha_i$. DSGD engine 408 evaluates, for each iteration, the gains of all thresholds $\theta_1, \ldots, \theta_k$ according to equation (8), and updates the threshold $\theta_i$ whose partial derivative is the largest. For example, for the threshold $\theta_i$ with the largest gain $\partial_i$, $\theta_i$ is updated with $\theta_i-\alpha_i$ (e.g., $\theta=(\theta_1, \ldots, \theta_k)$ is updated to become $\theta'_i=(\theta_1, \ldots, \theta_i-\alpha_i, \ldots, \theta_k)$.

Figure 7:
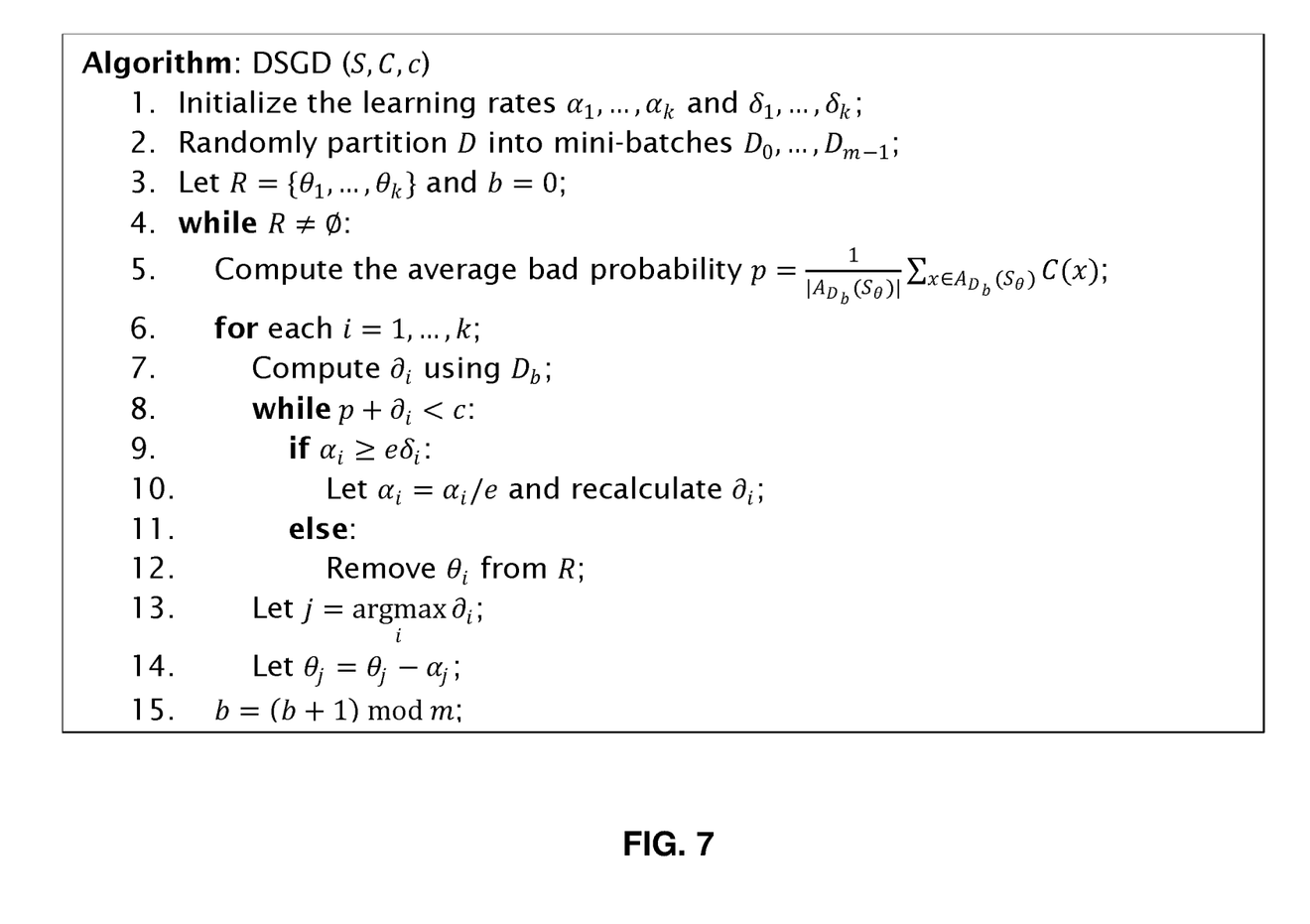
FIG. 7 is an example software listing of an example algorithm that may be executed by the fraud detection computing device of FIG. 1.

Additionally, DSGD engine 408 updates the learning rates $\alpha_i$, where $i=1, \ldots k$. That is, if a learning rate is too large such that the optimization constraint is violated (i.e., after updating the threshold, the new average bad probability is lower than parameter "c"), DSGD engine 408 shrinks $\alpha_i$ linearly or exponentially. However, DSGD engine 408 may stop optimizing $\theta_i$ when $\alpha_i$ is too small and can be ignored, e.g., $\alpha_i < \delta_i$. This is because there is not much room for improvement if the learning rate becomes negligible. DSGD engine 408 will continue to optimize thresholds in this manner until every threshold has been optimized, or until the stopping criteria is met. FIG. 7 shows a software listing in the form of pseudo code describing the above described DSGD algorithm. The software listing illustrates a factor 'e' which is employed to shrink learning rate $\alpha_i$. In addition, $\delta_i$ is a threshold value to prevent learning rate $\alpha_i$ from becoming too small to be negligible. For example, one may set e to 2 and $\delta_i$ to 1 or $10^{-5}$ as indicated above.

DR engine 410 may obtain strategy data 416 and execute a dimensionality reduction (DR) algorithm to generate a new strategy, which may be an extension to or an optimized version of the initial strategy generated by initial strategy engine 404. DR engine 410 produces a new strategy S" whose action space is a super set of the action space of an input strategy (e.g., initial strategy S). For example, suppose the input strategy is the strategy defined in equation 3 above. After executing the dimensionality reduction algorithm, the new strategy S" may become:

$$C(x) > 0.685 \text{ OR } (x_1 > 27 \text{ AND } (x_5 < 0.27)) \text{ OR } x_4 > 13 \quad \text{eq. (9)}$$

or $$C(x) > 0.75 \text{ OR } (x_1 > 30) \text{ AND } x_3 > 0.25 \quad \text{eq. (10)}$$

In the strategy defined by equation (9) the existing features/variables have been reduced from five in the initial strategy to four in the new strategy while keeping the thresholds the same or slightly modified. The new strategy is less restrictive than the input strategy and thereby enjoys a larger action space. However, in the strategy defined by equation (10), not only is the existing feature set reduced from five to three, but some existing features are replaced with new ones (e.g., $x_3$). The new features defined by equation (10) may identify an action space that is either adjacent to or distant from the initial space defined by the initial strategy. In that regard, DR engine 410 identifies the key (e.g., predominant) features from the input strategy and uses them to compose a new set of strategies. As such, the new strategy S" may have a different structure than the input strategy.

The dimensionality reduction algorithm that DR engine 410 executes may employ the steps of feature selection, feature transformation, separation factor, and feature importance factor.

01 Feature Selection ($F_s$)

At the feature selection step, a training data set is prepared with all the features $(X_1, X_2, X_3 \ldots X_n)$ extracted from the existing strategies (e.g., such as an initial strategy that may include the output of a classifier) and class/tagging/labels (e.g., the identification of whether a particular transaction is good or bad, e.g., fraudulent). The training data set may be stored in database 116, for example. Next, DR engine 410 employs a federated feature selection approach by polling recommendations from various feature selection algorithms such as filter methods, wrapper methods such as recursive feature elimination algorithms, and embedded methods such as regularization techniques. For example, DR engine 410 may select the top five features recommended by each algorithm, or a subset of features that make to the top 50 percent of features as ranked by each algorithm. In some examples, a user selects the selection criteria from user interface 205 using an I/O device 203. In some examples, DR engine 410 selects a maximum number of features, such as the top few features from each algorithm. DR engine 410 then proceeds to the next step—feature transformation.

02 Feature Transformation ($F_t$)

At this step, DR engine 410 discretizes and normalizes the features selected at the feature selection step through one or more binning algorithms. The binning algorithms may be, for example, feature scaling and normalization, weight of the evidence, variations of principal component analysis (PCA), or any other suitable binning algorithm. In some examples, a user selects the number of bins and the underlying binning algorithm, for example, from user interface 205 using an I/O device 203. The output of the binning algorithm may be a numeric (real) value ranging between 0 and 1. The transformed features (i.e., as transformed by the binning algorithm) may be denoted by $X_j^i$, where:

$$X_j^i \in [0,1] \quad \text{eq. (11)}$$

where:
i=1, ..., k (number of bins), and
j=1, ..., n (number of features)
DR engine 410 then proceeds to the next step—separation factor.

03 Separation Factor ($F_{sf}$)

At this step, the transformed features from the feature transformation step are weighted based on characteristics of the transactions (e.g., a type of transaction) the transformed features are associated with. For example, to create a wider separation effect between good (e.g., not fraudulent) and bad (e.g., fraudulent) transactions, DR engine 410 may weigh the transformed features based on whether they are associated with a good, or bad, transaction. DR engine 410 generates a Multiplication Factor or Index $M_j^i$ for the normalized features. $M_j^i$ is defined as the bad (e.g., fraudulent) rate of $i^{th}$ bin for any normalized feature Xj. DR engine 410 calculates $M_j^i$ as follows:

$M_j^i$=(Total number of bad class/labels in the $i^{th}$ bin of feature $X_j+\sigma$)/(Total number of records in the $i^{th}$ bin of feature $X_j+\sigma$) eq. (12)

where σ is a small positive real number (i.e., $10^{-5}$) and $M_j^i \in (0,1]$.

Thus, feature bins with better odds ratios (probability of good over probability of bad) than others will have higher Multiplication Factors. In other words, in those feature bins with high Multiplication Factors, the transactions labelled as bad (e.g., fraudulent transactions) are better separated from the transactions labelled as good (e.g., non-fraudulent transactions). DR engine 410 then proceeds to the next step—feature importance factor.

04 Feature Importance Factor ($F_{if}$)

At this step, DR engine 410 generates a feature importance factor to determine which features are more indicative of a fraudulent transaction. The feature importance factors may be determined, for example, by execution of the equation below:

$$F_j = \sum_{i=0}^{k} X_j^i * M_j^i \qquad \text{eq. (13)}$$

In some examples, the feature importance factors must meet a requirement. For example, the feature importance factors may need to meet a minimum importance factor requirement (i.e., $F_j > 0.125$ for j=1, ..., n), or they may need to meet a varying importance factor requirement (i.e., $F_1 > 0$, $F_2 > 0.5$, ... etc.). The requirements may be specified by a user, for example, by using I/O device 203 to input requirements into user interface 205. In some examples, two or more features are combined, where they must meet one or more of an upper bound requirement and a lower bound requirement. For example, equations (14) and (15) below show two such combinations:

$0.75 < F_1 + F_3 + F_7 < 1$ eq. (14)

$0 < F_7 + F_9 < 1.5$ eq. (15)

where, in addition, the following importance factor requirements must be met:
0.15<$F_1$<1
0.2<$F_3$<0.65
0<$F_7$<1
0<$F_9$<1

For every existing strategy, DR engine 410 may generate one or more linear inequalities that comprise relevant features, such as:

$I_j * F_j | I_j = 1$ if $F_j$ is selected (e.g., equations (14) and (15) are satisfied),$I_j = 0$ otherwise, for j=1, ... ,n eq. (16)

DR engine 410 may then determine a minimal set of predominant features that still satisfy one or more linear inequalities, such as those exemplified in equations (14) and (15), where $I_j = 1$ if $F_j$ is selected, and $I_j = 0$ otherwise. If $I_j$ is 0, then that particular feature cannot be used to satisfy the rule.

For example, DR engine 410 may solve the Integer Programming model as shown in the equation below:

$$\text{Min} \sum_{j=0}^{n} I_j \qquad \text{eq. (17)}$$

In this example, to satisfy the one or more inequalities shown in equations (14) and (15), the following equations would need to be satisfied:

$0.75 < I_1 F_1 + I_3 F_3 + I_7 F_7 < 1$ eq. (18)

$0 < I_7 F_7 + I_9 F_9 < 1.5$ eq. (19)

where $I_j \in \{0,1\}$.

Once the minimal set of predominant features are determined, DR engine 410 may generate a new strategy S' identified and characterized by modified strategy data 316 that either complements or replaces the existing strategy S. The new strategy S' may have different threshold values, a streamlined structure, and/or new features compared to the original strategy S. As such, strategy S' expands the action space defined by the original strategy to detect additional fraudulent activities.

Figure 5:
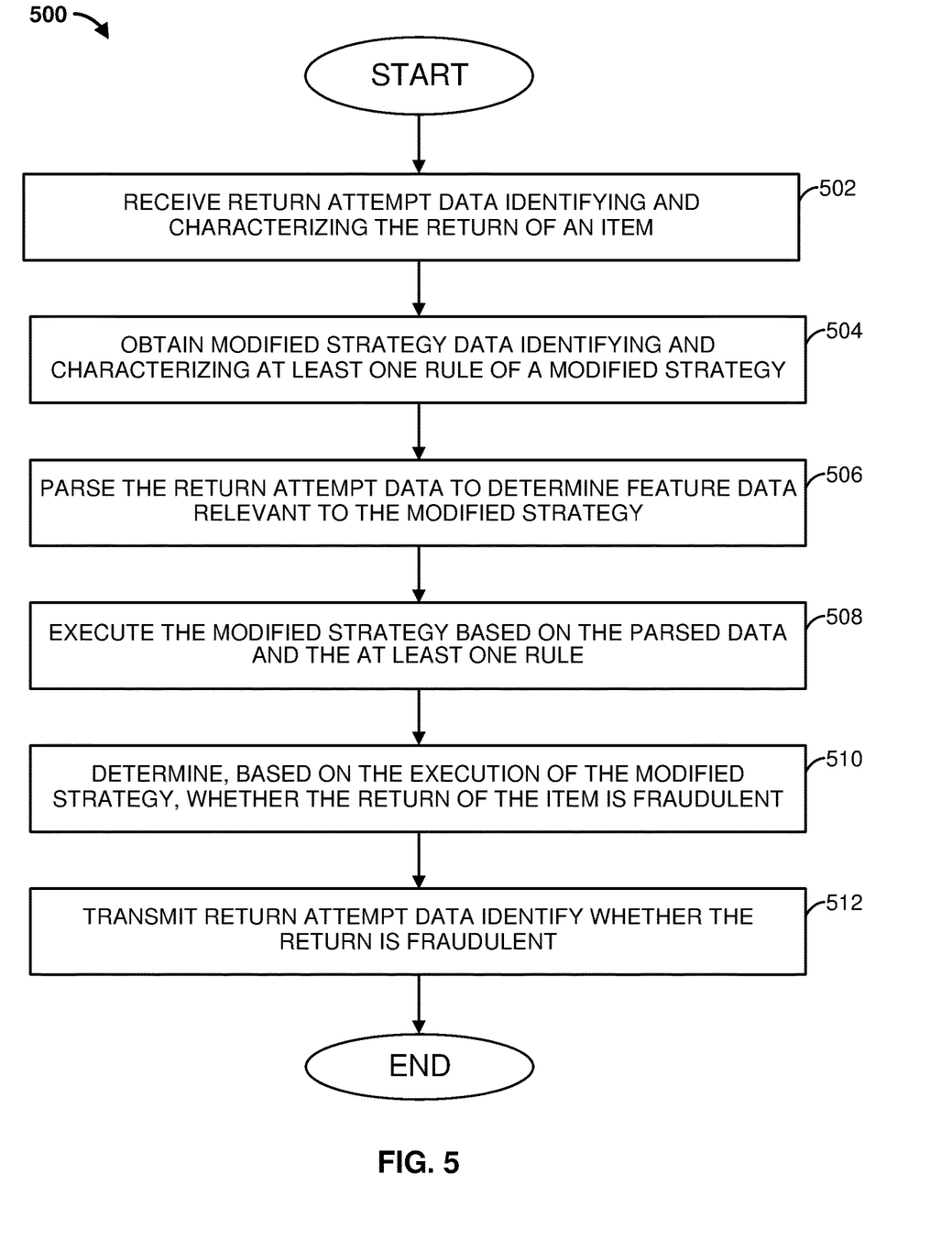
FIG. 5 is a flowchart of an example method that can be carried out by the fraud detection system 100 of FIG. 1 in accordance with some embodiments.

FIG. 5 is a flowchart of an example method 500 that can be carried out by the fraud detection system 100 of FIG. 1. Beginning at step 502, a computing device, such as fraud detection computing device 102, receives return attempt data, such as return attempt data 324, identifying and characterizing the return of item. The return attempt data may be received, for example, from store 109. At step 504, the computing device obtains modified strategy data, such as modified strategy data 316 from database 116, identifying and characterizing at least one rule of a modified strategy. Proceeding to step 506, the return attempt data is parsed to determine feature data that is relevant to the modified strategy. For example, the return attempt data is parsed to extract feature data that may be used by any rule of the modified strategy. At step 508, the modified strategy is executed based on the parsed data and the at least one rule of the modified strategy. Based on the execution of the modified strategy, at step 510 a determination is made as to whether the return of the item is fraudulent. At step 512, return attempt data identifying whether the return is fraudulent is transmitted. For example, the return attempt data may be transmitted to store 109.

Figure 6:
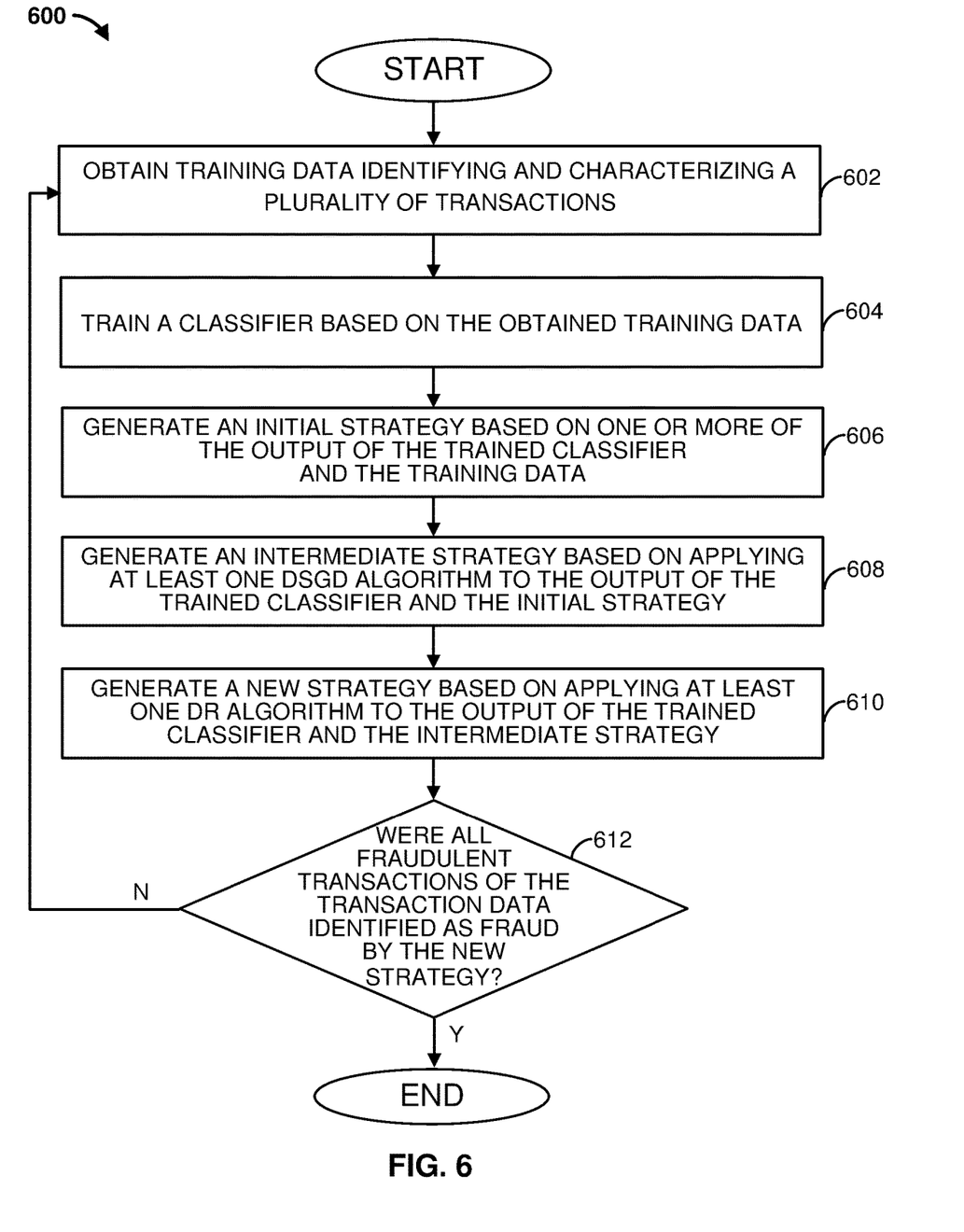
FIG. 6 is a flowchart of another example method that can be carried out by the fraud detection system 100 of FIG. 1 in accordance with some embodiments.

FIG. 6 is a flowchart of another example method 600 that can be carried out by the fraud detection system 100 of FIG. 1. At step 602, a computing device, such as fraud detection computing device 102, obtains training data identifying and characterizing a plurality of transactions. For example, fraud detection computing device 102 may obtain training data 420 from database 116. At step 604, a classifier is trained based on the training data. The classifier may be may be based on a supervised learning algorithm such as Logic Regression, Support Vector Machines, Random Forest, Gradient Boosting Machines, or any other suitable learning algorithm, for example. At step 606, an initial strategy is generated based on one or more of the outputs of the trained classifier and the training data. For example, the initial strategy may be generated by initial strategy engine 404 and may include one or more rules, where each rule may require the output of the classifier, or a feature of a transaction (as identified by the training data), to be beyond (e.g., greater than, less than, etc.) a threshold.

Proceeding to step 608, an intermediate strategy is generated based on applying at least one discrete stochastic gradient descent (DSGD) algorithm to the output of the trained classifier and the initial strategy. For example, DSGD engine 408 may apply on one or more discrete stochastic gradient descent algorithms to strategy data 416. At step 610, a new strategy is generated based on applying at least one dimensionality reduction (DR) algorithm to the output of the trained classifier and the intermediate strategy. For example, DR engine 410 may apply one or more dimensionality reduction algorithms to a strategy generated by DSGD engine 408 to provide modified strategy data 316.

At step 612, a determination is made as to whether all fraudulent transactions of the transaction data were identified as fraud by the new strategy. For example, each transaction of the training data may be identified as fraudulent or not. Fraud detection computing device 102 may compare the fraud identification of each transaction to a fraud determination based on the new strategy. If any transactions that should have been determined to be fraud are not identified as such by the new strategy, the method proceeds back to step 602, where the classifier is re-trained. Otherwise, the method ends.

Although the methods described above are with reference to the illustrated flowcharts, it will be appreciated that many other ways of performing the acts associated with the methods can be used. For example, the order of some operations may be changed, and some of the operations described may be optional.

In addition, the methods and system described herein can be at least partially embodied in the form of computer-implemented processes and apparatus for practicing those processes. The disclosed methods may also be at least partially embodied in the form of tangible, non-transitory machine-readable storage media encoded with computer program code. For example, the steps of the methods can be embodied in hardware, in executable instructions executed by a processor (e.g., software), or a combination of the two. The media may include, for example, RAMs, ROMs, CD-ROMs, DVD-ROMs, BD-ROMs, hard disk drives, flash memories, or any other non-transitory machine-readable storage medium. When the computer program code is loaded into and executed by a computer, the computer becomes an apparatus for practicing the method. The methods may also be at least partially embodied in the form of a computer into which computer program code is loaded or executed, such that, the computer becomes a special purpose computer for practicing the methods. When implemented on a general-purpose processor, the computer program code segments configure the processor to create specific logic circuits. The methods may alternatively be at least partially embodied in application specific integrated circuits for performing the methods.

The foregoing is provided for purposes of illustrating, explaining, and describing embodiments of these disclosures. Modifications and adaptations to these embodiments will be apparent to those skilled in the art and may be made without departing from the scope or spirit of these disclosures.

What is claimed is:

1. A system comprising:
   a communications interface configured to communicate with a second computing device over one or more networks;
   a database storing historical transaction data of a plurality of customers; and
   a first computing device communicatively coupled to the database and communications interface, the first computing device configured to:
   obtain, from the historical transaction data of the plurality of customers stored in the database, a set of training examples including data characterizing one or more instances of a return of one or more items and data characterizing which of the one or more instances of the return of one or more items is a fraud instance or non-fraud instance;
   train a classifier engine with the set of training examples;
   determine, via the classifier engine, class data and fraud probability data associated with the customer transaction data;
   obtain, via an initial strategy engine, the determined class data and fraud probability data from the classifier engine and the set of training examples from the database;
   based on the determined class data and fraud probability data from the classifier engine and the set of training examples from the database obtained via the initial strategy engine, generate, via the initial strategy engine, initial strategy data characterizing an initial strategy comprising one or more first rules defining a first action space, and wherein the initial strategy classifies an input transaction using a first feature set;
   apply, via a discrete stochastic gradient descent (DSGD) engine, at least one discrete stochastic gradient descent (DSGD) algorithm to the initial strategy to generate modified strategy data characterizing a modified strategy comprising at least one second rule defining a second action space, wherein the second action space is larger than the first action space, and wherein the modified strategy data classifies an input transaction using a second feature set, wherein the second feature set includes at least a portion of the first feature set and the output of the initial strategy engine;
   store the initial strategy data and the modified strategy data in the database;
   update the set of training examples based on an output of the modified strategy, wherein the updated set of training examples includes data characterizing at least one instance of a return as a fraud instance and at least one instance of the return as a non-fraud instance;
   re-train the classifier engine based on the updated set of training examples;
   update the modified strategy based on the updated set of training examples and an output of the re-trained classifier engine;
   receive, over the one or more networks and from the second computing device, return data identifying a return of at least one item;
   determine, based on the return data, a customer identifier;
   obtain, from the database, customer transaction data based on the customer identifier;
   generate classifier data based on applying the re-trained classifier engine to the received return data identifying the return of the at least one item and to the customer transaction data, the classifier data characterizing a value associated with the return of the at least one item being fraudulent;
   determine whether the return of the at least one item is fraudulent based on the generated classifier data;
   based on the determination, generate fraud data identifying whether the return of the at least one item is fraudulent; and
   store the fraud data in the database.

2. The system of claim 1, wherein the at least one second rule of the modified strategy is based further on the application of the at least one DSGD algorithm to feature data.

3. The system of claim 2, wherein the feature data comprises an amount of the return of the at least one item.

4. The system of claim 3, wherein the feature data further comprises an indication of whether a receipt was presented for the return of the at least one item, and a number of items of the at least one item.

5. The system of claim 1, wherein the at least one second rule comprises a requirement that the output of the initial strategy be beyond a threshold.

6. The system of claim 1, wherein the DSGD algorithm is based on the generation of a learning rate $\alpha_i$ for each threshold $\theta_i$ of an inequality of at least one rule of the initial strategy.

7. The system of claim 6, wherein the DSGD algorithm, at each of a plurality of iterations, determines a gain $\partial_i$ of each threshold $\theta_i$ of the inequality of the least one rule of the initial strategy in accordance with $$\partial_i = \frac{1}{|A_D(S_{\theta_i'})|}\sum_{x \in A_D(S_{\theta_i'})} C(x) - \frac{1}{|A_D(S_\theta)|}\sum_{x \in A_D(S_\theta)} C(x).$$

8. The system of claim 7, wherein the DSGD algorithm, at each of the plurality of iterations, modifies the threshold based on a largest partial derivative.

9. A computer-implemented method comprising:
obtaining, by a first computing device and from historical transaction data of a plurality of transaction data stored in a database, a set of training examples including data characterizing one or more instances of a return of one or more items and data characterizing which of the one or more instances of the return of one or more items is a fraud instance or non-fraud instance;
training a classifier engine with the set of training examples;
determining, via the classifier engine, class data and fraud probability data associated with the customer transaction data;
obtaining, via an initial strategy engine, the determined class data and fraud probability data from the classifier engine and the set of training examples from the database;
based on the determined class data and fraud probability data from the classifier engine and the set of training examples from the database obtained via the initial strategy engine, generating, via the initial strategy engine, initial strategy data characterizing an initial strategy comprising one or more first rules defining a first action space, and wherein the initial strategy classifies an input transaction using a first feature set;
applying, via a discrete stochastic gradient descent (DSGD) engine, at least one discrete stochastic gradient descent (DSGD) algorithm to the initial strategy to generate modified strategy data characterizing a modified strategy comprising at least one second rule defining a second action space, wherein the second action space is larger than the first action space, and wherein the modified strategy data classifies an input transaction using a second feature set, wherein the second feature set includes at least a portion of the first feature set and the output of the initial strategy engine;
storing the initial strategy data and the modified strategy data in the database;
updating the set of training examples based on an output of the modified strategy, wherein the updated set of training examples includes data characterizing at least one instance of a return as a fraud instance and at least one instance of the return as a non-fraud instance;
re-training the classifier engine based on the updated set of training examples;
updating the modified strategy based on the updated set of training examples and an output of the re-trained classifier engine;
receiving, over one or more networks and from a second computing device, return data identifying a return of at least one item;
determining, based on the return data, a customer identifier;
obtaining, from the database, customer transaction data based on the customer identifier;
generating classifier data based on applying the re-trained classifier engine to the received return data identifying the return of the at least one item and to the customer transaction data, the classifier data characterizing a value associated with the return of the at least one item being fraudulent;
determining whether the return of the at least one item is fraudulent based on the generated classifier data;
based on the determination, generating fraud data identifying whether the return of the at least one item is fraudulent; and
storing the fraud data in the database.

10. The computer-implemented method of claim 9, wherein the at least one second rule of the modified strategy is based further on the application of the at least one DSGD algorithm to feature data.

11. The computer-implemented method of claim 10, wherein the feature data comprises an amount of the return of the at least one item.

12. The computer-implemented method of claim 9, wherein the DSGD algorithm is based on the generation of a learning rate $\alpha_i$ for each threshold $\theta_i$ of an inequality of at least one rule of the initial strategy.

13. The computer-implemented method of claim 12, wherein the DSGD algorithm, at each of a plurality of iterations, determines a gain $\partial_i$ of each threshold $\theta_i$ of the inequality of the least one rule of the initial strategy in accordance with $$\partial_i = \frac{1}{|A_D(S_{\theta_i'})|}\sum_{x \in A_D(S_{\theta_i'})} C(x) - \frac{1}{|A_D(S_\theta)|}\sum_{x \in A_D(S_\theta)} C(x).$$

14. The computer-implemented method of claim 13, wherein the DSGD algorithm, at each of the plurality of iterations, modifies the threshold based on a largest partial derivative.

15. A non-transitory computer readable medium having instructions stored thereon, wherein the instructions, when executed by at least one processor, cause a device to perform operations comprising:
obtaining, from historical transaction data of a plurality of transaction data stored in a database, a set of training examples including data characterizing one or more instances of a return of one or more items and data characterizing which of the one or more instances of the return of one or more items is a fraud instance or non-fraud instance;
training a classifier engine with the set of training examples;

determining, via the classifier engine, class data and fraud probability data associated with the customer transaction data;

obtaining, via an initial strategy engine, the determined class data and fraud probability data from the classifier engine and the set of training examples from the database;

based on the determined class data and fraud probability data from the classifier engine and the set of training examples from the database obtained via the initial strategy engine, generating, via the initial strategy engine, initial strategy data characterizing an initial strategy comprising one or more first rules defining a first action space, and wherein the initial strategy classifies an input transaction using a first feature set;

applying, via a discrete stochastic gradient descent (DSGD) engine, at least one discrete stochastic gradient descent (DSGD) algorithm to the initial strategy to generate modified strategy data characterizing a modified strategy comprising at least one second rule defining a second action space, wherein the second action space is larger than the first action space, and wherein the modified strategy data classifies an input transaction using a second feature set, wherein the second feature set includes at least a portion of the first feature set and the output of the initial strategy engine;

storing the initial strategy data and the modified strategy data in the database;

updating the set of training examples based on an output of the modified strategy, wherein the updated set of training examples includes data characterizing at least one instance of a return as a fraud instance and at least one instance of the return as a non-fraud instance;

re-training the classifier engine based on the updated set of training examples;

updating the modified strategy based on the updated set of training examples and an output of the re-trained classifier engine;

receiving, over one or more networks and from a computing device, return data identifying a return of at least one item;

determining, based on the return data, a customer identifier;

obtaining, from the database, customer transaction data based on the customer identifier;

generating classifier data based on applying the re-trained classifier engine to the received return data identifying the return of the at least one item and to the customer transaction data, the classifier data characterizing a value associated with the return of the at least one item being fraudulent;

determining whether the return of the at least one item is fraudulent based on the generated classifier data;

based on the determination, generating fraud data identifying whether the return of the at least one item is fraudulent; and storing the fraud data in the database.

16. The non-transitory computer readable medium of claim 15, further comprising instructions stored thereon that, when executed by the at least one processor, further cause the device to perform operations comprising applying the at least one DSGD algorithm to the initial strategy to determine the at least one second rule of the modified strategy by:

generating a learning rate $\alpha_i$ for each threshold $\theta_i$ of an inequality of at least one rule of the initial strategy.

17. The non-transitory computer readable medium of claim 16, further comprising instructions stored thereon that, when executed by the at least one processor, further cause the device to perform operations comprising applying the at least one DSGD algorithm to the initial strategy to determine the at least one second rule of the modified strategy by:

determining, for each of a plurality of iterations, a gain $\partial_i$ of each threshold $\theta_i$ of the inequality of the least one rule of the initial strategy in accordance with $$\partial_i = \frac{1}{|A_D(S_{\theta_i'})|} \sum_{x \in A_D(S_{\theta_i'})} C(x) - \frac{1}{|A_D(S_\theta)|} \sum_{x \in A_D(S_\theta)} C(x).$$

* * * * *